United States Patent
Mihara et al.

(10) Patent No.: US 10,270,100 B2
(45) Date of Patent: *Apr. 23, 2019

(54) ELECTRODE MATERIAL, AND LITHIUM-ION BATTERY OR LITHIUM-ION CAPACITOR USING SAME

(71) Applicant: TORAY INDUSTRIES, INC., Tokyo (JP)

(72) Inventors: Takaaki Mihara, Otsu (JP); Kentaro Tanaka, Otsu (JP); Kosaku Takeuchi, Otsu (JP); Tomoyuki Horiguchi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/325,947

(22) PCT Filed: Jul. 9, 2015

(86) PCT No.: PCT/JP2015/069760
§ 371 (c)(1),
(2) Date: Jan. 12, 2017

(87) PCT Pub. No.: WO2016/009938
PCT Pub. Date: Jan. 21, 2016

(65) Prior Publication Data
US 2017/0170478 A1    Jun. 15, 2017

(30) Foreign Application Priority Data
Jul. 15, 2014   (JP) ................................ 2014-144790

(51) Int. Cl.
*H01B 1/04* (2006.01)
*H01M 4/38* (2006.01)
(Continued)

(52) U.S. Cl.
CPC ............. *H01M 4/587* (2013.01); *C01B 32/05* (2017.08); *C01B 32/366* (2017.08); *H01B 1/04* (2013.01);
(Continued)

(58) Field of Classification Search
CPC .. H01B 1/00; H01B 1/04; H01B 1/24; H01M 4/38; C01B 32/00; C01B 32/15; C01B 32/30
See application file for complete search history.

(56) References Cited

U.S. PATENT DOCUMENTS

| 7,091,156 B2 * | 8/2006 | Hirahara | ................ | H01G 11/24 |
| | | | | 361/502 |
| 2005/0260118 A1 * | 11/2005 | Lu | ........................ | B01D 53/228 |
| | | | | 423/445 R |

(Continued)

FOREIGN PATENT DOCUMENTS

| CN | 101454243 A | 6/2009 |
| CN | 106660797 A | 5/2017 |

(Continued)

OTHER PUBLICATIONS

Tang et al "Fabrication of a high-strength hydrogel with an interpenetrating network structure", Colloids and Surfaces A: Physiochem. Eng. Aspects 346 (2009) 91-98. (Year: 2009) (Year: 2009).*

(Continued)

*Primary Examiner* — Mark Kopec
(74) *Attorney, Agent, or Firm* — RatnerPrestia

(57) ABSTRACT

Provided is an electrode material which has a co-continuous porous structure configured from a carbon skeleton and voids and which, by providing a large surface area, has excellent electrical conductivity, thermal conductivity, etc. This electrode material includes a porous carbon material having a co-continuous structure portion in which a carbon (Continued)

skeleton and voids form a continuous structure, and in the porous carbon material, the specific surface area measured by the BET method is 1 to 4500 m$^2$/g, and the pore volume measured by the BJH method is 0.01 to 2.0 cm$^3$/g.

9 Claims, 1 Drawing Sheet

(51) Int. Cl.

| | | |
|---|---|---|
| C01B 32/00 | (2017.01) | |
| H01G 11/00 | (2013.01) | |
| H01M 4/587 | (2010.01) | |
| H01G 11/06 | (2013.01) | |
| H01G 11/24 | (2013.01) | |
| H01G 11/44 | (2013.01) | |
| H01G 11/46 | (2013.01) | |
| H01M 4/36 | (2006.01) | |
| H01M 4/48 | (2010.01) | |
| H01G 11/26 | (2013.01) | |
| H01G 11/34 | (2013.01) | |
| H01G 11/50 | (2013.01) | |
| H01M 10/0525 | (2010.01) | |
| C01B 32/05 | (2017.01) | |
| C01B 32/366 | (2017.01) | |
| H01M 4/02 | (2006.01) | |

(52) U.S. Cl.
CPC .......... *H01G 11/06* (2013.01); *H01G 11/24* (2013.01); *H01G 11/26* (2013.01); *H01G 11/34* (2013.01); *H01G 11/44* (2013.01); *H01G 11/46* (2013.01); *H01G 11/50* (2013.01); *H01M 4/36* (2013.01); *H01M 4/364* (2013.01); *H01M 4/38* (2013.01); *H01M 4/386* (2013.01); *H01M 4/48* (2013.01); *H01M 10/0525* (2013.01); *C01P 2006/12* (2013.01); *C01P 2006/14* (2013.01); *C01P 2006/40* (2013.01); *H01M 2004/021* (2013.01); *Y02E 60/13* (2013.01)

(56) References Cited

U.S. PATENT DOCUMENTS

| | | | |
|---|---|---|---|
| 2009/0176079 A1 | 7/2009 | Cabrera-Perez | |
| 2009/0269667 A1* | 10/2009 | Antonietti | H01G 11/34 429/231.4 |
| 2013/0084501 A1* | 4/2013 | Wakayama | H01M 4/1397 429/231.8 |
| 2013/0181172 A1 | 7/2013 | Nishi | |
| 2013/0330504 A1* | 12/2013 | Morishita | B32B 3/12 428/116 |
| 2014/0056798 A1 | 2/2014 | Fletcher et al. | |
| 2014/0287306 A1 | 9/2014 | Takeshi et al. | |
| 2017/0166451 A1 | 6/2017 | Horiguchi et al. | |
| 2017/0331101 A1* | 11/2017 | Tachibana | H01M 4/505 |

FOREIGN PATENT DOCUMENTS

| | | | |
|---|---|---|---|
| EP | 3165506 A1 | 5/2017 | |
| JP | 2004026954 | 1/2004 | |
| JP | 2007039289 | 2/2007 | |
| JP | 2008169071 | 7/2008 | |
| JP | 2009538813 | 11/2009 | |
| JP | 2013219059 | 10/2013 | |
| WO | 2012020561 | 2/2012 | |
| WO | 2012131628 | 10/2012 | |
| WO | WO-2012131628 A1 * | 10/2012 | ............ H01M 4/133 |
| WO | 2014024395 A1 | 2/2014 | |

OTHER PUBLICATIONS

Han et al "Porous graphite matrix for chemical heat pumps", Carbon vol. 36, No. 12, pp. 1801-1810. (Year: 1998) (Year: 1998).*
Hwang et al "Capacitance control of carbon aerogel electrodes", Journal of Non-Crystalline Solids 347 (2004) 238-245. (Year: 2004) (Year: 2004).*
Borchardt et al "Toward a molecular design of porous carbon materials", Materials Today, vol. 20, No. 10, Dec. 2017, pp. 593-610. (Year: 2017).*
Zakhidov et al "Carbon structures with three-dimensional periodicity at optical wavelengths", Science vol. 282, Oct. 1998, pp. 897-901. (Year: 1998) (Year: 1998).*
International Search Report and Written Opinion for International Application No. PCT/JP2015/069760, dated Aug. 25, 2015, 6 pages.
Barrett et al., "The the Determination of Pore Volume and Area Distributions in Porous Substances. I. Computations from Nitrogen Isotherms", J. Amer. Chem. Soc., vol. 73, Jan. 1951, pp. 373-380.
Extended European Search Report for European Application No. 15822405.5, dated Dec. 1, 2017, 8 pages.
Chinese Office Action for Chinese Application No. 201580037152. 1, dated Aug. 3, 2018, with translation, 13 pages.

* cited by examiner

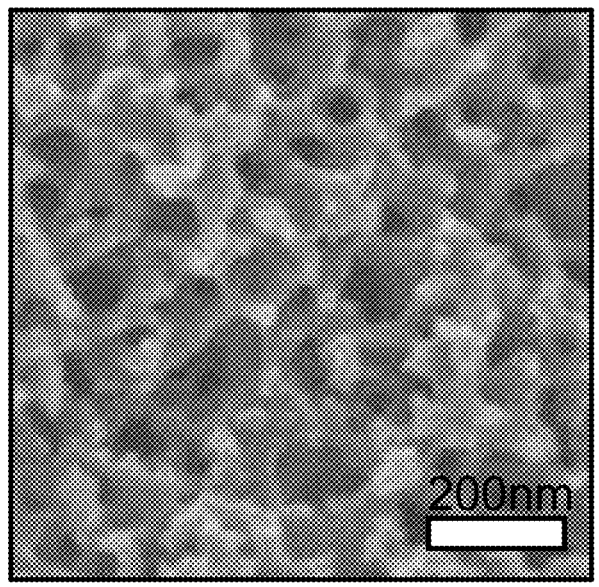

ELECTRODE MATERIAL, AND LITHIUM-ION BATTERY OR LITHIUM-ION CAPACITOR USING SAME

CROSS REFERENCE TO RELATED APPLICATIONS

This application is the U.S. National Phase application of PCT International Application No. PCT/JP2015/069760, filed Jul. 9, 2015, and claims priority to Japanese Patent Application No. 2014-144790, filed Jul. 15, 2014, the disclosures of each of these applications being incorporated herein by reference in their entireties for all purposes.

FIELD OF THE INVENTION

The present invention relates to an electrode material used for a lithium-ion battery, a lithium-ion capacitor and the like.

BACKGROUND OF THE INVENTION

In recent years, a lithium-ion battery and a lithium-ion capacitor respectively having a high battery voltage and high energy density receive attention from the standpoint of an energy storage system noting renewable energy and from the standpoint of development of personal computers, cameras, mobile equipment and the like, and research and development thereof is actively progressed. As these negative electrode active materials, a carbon material is commonly used for the reasons that lithium can be absorbed/released, dendrite-like lithium is hardly deposited and safety is high, and a capacity is relatively high and excellent cycle characteristics are shown.

Then, in order to respond to request asking a higher capacity of a negative electrode of recent years, various investigations have been made, and for example, a porous carbon material is proposed in which a contact area between the electrolyte and the negative electrode active material is increased to decrease an internal resistance of a battery and thereby a charge-discharge capacity is increased, and a contact area with the electrolyte is increased to realize a high rate characteristics (Patent Document 1).

On the other hand, in order to achieve a higher capacity of the lithium secondary battery, a method of using an elemental metal such as Si, Sn, Al or the like, an alloy or oxides thereof is proposed. For example, while in a negative electrode material made of graphite, a capacity is limited to a theoretical capacity of 372 mAh/g, a negative electrode material, such as Si, Sn, Al or the like, which is alloyed with lithium, particularly Si, has a theoretical capacity of 4200 mAh/g. Therefore, it is said that a capacity can be increased infinitely by adding these negative electrode materials. However, these negative electrode materials have a problem that since the negative electrode material involves large changes in volume during charge-discharge, this causes cracks and exfoliation of the negative electrode active material and the collapse of the negative electrode to shorten a cycle life of charge-discharge.

Thus, a method of preventing the collapse by forming voids within the negative electrode material containing silicon oxide and a carbon material is proposed on the above-mentioned problem (Patent Document 2). The voids are formed by volatilizing a polymer having dispersed during carbonization.

PATENT DOCUMENTS

Patent Document 1: Japanese Patent Laid-open Publication No. 2007-39289
Patent Document 2: Japanese Patent Laid-open Publication No. 2013-219059

SUMMARY OF THE INVENTION

However, the electrode material described in Patent Document 1 has not adequately exerted performance though it has a high surface area. The reason for this is supposedly that the surface of the electrode material is not adequately utilized since pores are not communicated with one another and therefore lithium ions reach the useful surface slowly or cannot reach the surface.

Moreover, also in a composite electrode of a carbon material and a metal capable of being alloyed with lithium, the composite electrode enabling to increase a capacity, a negative electrode material described in Patent Document 2 has not adequately suppress the collapse of the negative electrode due to expansion of a volume. The reason for this is supposedly that as was expected, voids formed are not communicated with one another.

The present invention provides an electrode material which can effectively use an active material surface by improving the accessibility of the electrolyte to the active material surface in an electrode material using a porous carbon material, and is particularly suitable for a lithium-ion battery and a lithium-ion capacitor. Further, the present invention provides an electrode material which can effectively absorb the expansion/contraction associated with charge-discharge in the case where an electrode material contains a metal or the like.

The present inventors noted to control a structure of a pore or a volume of a pore in addition to providing voids (pores) in order to effectively absorb the expansion/contraction associated with charge-discharge in the composite electrode of a carbon material and a metal capable of being alloyed with lithium, and they made earnest investigations to lead to the present invention.

The present invention pertains to an electrode material comprising a porous carbon material having a co-continuous structure portion in which a carbon skeleton and voids form a continuous structure, wherein in the porous carbon material, the specific surface area measured by the BET method is 1 to 4500 $m^2/g$, and the pore volume measured by the BJH method is 0.01 to 2.0 $cm^3/g$.

Since the electrode material according to an aspect of the present invention has a co-continuous structure portion and voids being a portion other than the carbon skeleton also form a continuous structure, the electrolyte can be rapidly moved, and an effective contact area between the electrolyte and the active material increases to thereby enable to exert high charge-discharge characteristics. Further, since the carbon skeletons are continued, the electrical conductivity can be enhanced. In addition to these, an effect in which the carbon skeletons forming a continuous structure support one another to maintain the structural body and voids being a portion other than the carbon skeleton also form a continuous structure, is produced, and due to this effect, the material also has resistance to deformations such as ones caused by compression or the like.

BRIEF DESCRIPTION OF THE DRAWING

FIG. 1 illustrates a scanning electron photomicrograph of a porous carbon material in Example 1.

DETAILED DESCRIPTION OF EMBODIMENTS OF THE INVENTION

<Electrode Material>

"The electrode material" referred to in the present invention refers to a material capable of absorbing/releasing lithium ions which is used as an electrode of an electric storage device using lithium ions as an electric conduction substance. Examples of such electric storage devices which are currently investigated include a lithium-ion battery and a lithium-ion capacitor, and the electrode material of the present invention can be used as electrode materials thereof, particularly as a negative electrode material.

The electrode material of the present invention includes a porous carbon material. Herein, the electrode material of an embodiment of the present invention includes an electrode material made of only a porous carbon material, and an electrode material formed by compositing the porous carbon material with a metal capable of reversibly absorbing/releasing a lithium metal. That is, the electrode material is a porous carbon material itself in the former, and is a composite material of a porous carbon material and a metal in the latter.

[Porous Carbon Material]

In the present invention, the carbon material refers to a material predominantly composed of carbon which is obtained by pyrolyzing a carbonizable resin described later, and non-graphitizable carbon (hard carbon) and easily graphitizable carbon (soft carbon) are preferably exemplified. Particularly, a carbon material comprising the non-graphitizable carbon is preferably used in the present invention since a carbon plane is not oriented and input/output performance is excellent. The non-graphitizable carbon is a carbon material which is lower in orientation than crystalline carbon such as graphite, and therefore, it is possible to easily adjust the specific surface area of a fine pore to the range of the present invention. Further, particularly, when the specific surface area is as large as 1 m$^2$/g or more, preferably 10 m$^2$/g or more, the non-graphitizable carbon has an advantage that a reduction of performance due to decomposition of the electrolyte hardly occurs compared with graphite. In addition, a raw material or the like of the carbon material will be described in detail in the description of a production method.

The porous carbon material used in the electrode material of the present invention (hereinafter, sometimes referred to as "the porous carbon material of the present invention" or as merely "the porous carbon material" for convenience) has a co-continuous structure portion in which a carbon skeleton and voids each form a continuous structure. That is, when for example, a specimen adequately cooled in liquid nitrogen is split with tweezers or the like and surface of the resulting cross-section is observed with a scanning electron microscope (SEM) or the like, a carbon skeleton and voids which are formed as a portion other than the skeleton take on a co-continuous structure, and specifically, the carbon material has a portion observed as a structure in which a carbon skeleton and voids are respectively continued inward, as illustrated in the scanning electron photomicrograph of the porous carbon material of Example 1 of FIG. 1.

In the porous carbon material of the present invention, it is possible to exert a rapid movement characteristic of the electrolyte by filling and/or passing an electrolytic solution into or through the voids of the co-continuous structure portion. Further, since the continued carbon skeleton brings about increased electrical conductivity and thermal conductivity, the electrode material having low resistance and low loss can be provided. Further, it is also possible to rapidly transfer the heat to and from outside the system to keep high temperature-uniformity. In addition to these, an effect in which carbon skeleton portions support one another to maintain the structural body is produced, and due to this effect, the electrode material has large resistance to deformations such as ones caused by tension or compression.

Examples of these co-continuous structures include the form of a grid and the form of a monolith. These co-continuous structures are not particularly limited; however, the form of a monolith is preferred in point of being able to exert the above-mentioned effect. The form of a monolith referred to in the present invention refers a form in which the carbon skeleton forms a three-dimensional network structure in the co-continuous structure and is distinguished from an irregular structure like a structure in which separate particles are aggregated and combined or like a structure formed of voids generated by conversely removing the aggregated/combined mold particles and a skeleton around the voids.

Further, the co-continuous structure portion has a preferable structural period of 0.002 μm to 3 μm. In the present invention, the structural period is determined by irradiating a specimen of the porous carbon material of the present invention with X-rays having a wavelength λ by the X-ray scattering method and calculating a structural period from the scattering angle θ corresponding to a local maximum value of peaks of the scattering intensity, using the following equation. When the structural period exceeds 1 μm and the scattering intensity peak of the X-ray cannot be observed, the co-continuous structure portion of the porous carbon material is three-dimensionally photographed by an X-ray CT method, Fourier-transform is applied to the resulting image to obtain a spectrum, and the structural period is similarly calculated. That is, the spectrum referred to in the present invention is data representing a relationship between the one-dimensional scattering angle and the scattering intensity which is obtained by the X-ray scattering method or obtained by the Fourier-transform from the X-ray CT method.

$$L=\lambda/(2 \sin \theta)$$

Structural period: L, λ: wavelength of incident X-rays, θ: scattering angle corresponding to a local maximum value of peak values of the scattering intensity When the structural period of the co-continuous structure portion is 0.002 μm or more, an electrolytic solution can be easily filled into and/or flown through a void portion, and electrical conductivity and thermal conductivity can be significantly improved through the carbon skeleton. Further, in the case where an embodiment of containing a metal as described later is employed, expansion and contraction associated with charge-discharge can be effectively absorbed. The structural period is more preferably 0.01 μm or more, and even more preferably 0.1 μm or more. When the structural period is 3 μm or less, a high surface area and high properties are easily attained. The structural period is more preferably 2 μm or less, and even more preferably 1 μm or less. In addition, in performing analysis of the structural period by an X-ray, the portion not having the co-continuous structure does not have the effect on the analysis because the structural period is out of the above-mentioned range. Accordingly, the structural period calculated by the above-mentioned equation is taken as a structural period of a co-continuous structure-forming portion.

Further, the co-continuous structure portion preferably has an average porosity of 10 to 80%. The term "average porosity" refers to a porosity determined by obtaining a precisely formed cross-section of an embedded specimen by the cross-section polisher method (CP method), examining the cross-section at a magnification regulated so as to result in 1±0.1 (nm/pixel) and at a resolution of 700000 pixels or higher, setting in the resultant image a square examination region for calculation in which each side has 512 pixels, and calculating the average porosity using the following equation, in which A is the area of the examination region and B is the area of the pores.

Average porosity(%)=$B/A$×100

The higher the average porosity thereof is, the more a movement of an electrolyte is rapid, and the lower the average porosity is, the higher the resistance to forces applied in cross-sectional directions is, such as compression and bending, and hence the more the material is advantageous in terms of handleability and use under pressure. In view of these, the average porosity of the co-continuous structure portion is preferably 15 to 75%, and even more preferably 18 to 70%.

It is also a preferred embodiment that the porous carbon material of the present invention has microscopic pores at the surface. The term "surface" refers to all surfaces, in contact with the outside, of the porous carbon material including the surface of a carbon skeleton in the co-continuous structure portion of the carbon material. The microscopic pore can be formed at the surface of the carbon skeleton in the co-continuous structure portion and/or in a portion not substantially having the co-continuous structure described later. The microscopic pore is preferably formed at least at the surface of a carbon skeleton in a portion having the co-continuous structure. Such microscopic pores can be formed by activation treatment as described later. Particularly, in the case of producing an electrode material composited with a metal, as described later, when the electrode material is adapted to support a metal in the microscopic pores, it is preferred since a passage way of the electrolyte can be ensured by the voids in the co-continuous structure even when a volume of metal is expanded/contracted due to charge-discharge.

The porous carbon material of an embodiment of the present invention has a pore volume of 0.01 to 2.0 $cm^3/g$ which is measured by the BJH method. When the pore volume is 0.01 $cm^3/g$ or more, particularly battery performance characteristic at low temperatures can be improved. When the pore volume is set to 2.0 $cm^3/g$ or less, strength of the porous carbon material is deteriorated, a fine pore is hardly collapsed and good handleability can be maintained. The pore volume is more preferably 0.05 $cm^3/g$ or more, and even more preferably 0.10 $cm^3/g$ or more.

Further, a volume ratio (Vm/Vb) of a pore volume (Vm) measured by a MP method to a pore volume (Vb) measured by the BJH method is preferably 1.0 or less. Since the volume ratio (Vm/Vb) is 1.0 or less, the electrolyte can adsorb and desorb with efficiency and excellent charge-discharge characteristics can be attained. The volume ratio (Vm/Vb) is more preferably 0.5 or less, and even more preferably 0.1 or less.

The BJH method and the MP method are a method widely used as a pore size distribution analytical method, and the pore size distribution can be determined based on a desorption isotherm determined by adsorption/desorption of nitrogen on the electrode material. The BJH method is a method of analyzing a distribution of a pore volume with respect to a diameter of a fine pore assumed to be cylindrical according to a standard model of Barrett-Joyner-Halenda, and is mainly applicable to fine pores having a diameter of 2 to 200 nm (refer to J. Amer. Chem. Soc., 73, 373, 1951 etc. in detail).

The MP method is a method in which an external surface area and an adsorption layer thickness (corresponding to a pore radius since a pore shape is assumed as to be cylindrical) of each section of an adsorption isotherm is determined from a change in the slope of a tangent line at each point of the isotherm, and a pore volume is determined based on this and plotted with respect to the adsorption layer thickness to obtain a pore size distribution (refer to Journal of Colloid and Interface Science, 26, 45, 1968 etc. in detail), and this method is mainly applicable to fine pores having a diameter of 0.4 to 2 nm.

Further, in the electrode material of the present invention, the average pore diameter measured by the BJH method or the MP method is preferably 1 nm or more. The average pore diameter of at least 1 nm enables to reduce an irreversible capacity and to improve charge-discharge characteristics. The average pore diameter is more preferably 5 nm or more, and even more preferably 10 nm or more.

Moreover, in the electrode material of the present invention, a surface area ratio (Sm/Sb) of a surface area (Sm) measured by a MP method to a surface area (Sb) measured by the BJH method is preferably 1.0 or less, and more preferably 0.5 or less. In a general electrode base material, a correlation is found between the pore volume/pore size and the specific surface area, and the smaller the pore size is, the more the pore volume and the specific surface area tend to increase. The charge-discharge characteristics are improved by an increase of the specific surface area. On the other hand, in the general electrode base material, there is a problem of so-called trade-off that an increase in fine pores with small diameter causes an increase in irreversible capacity. However, the electrode material of the present invention can pursue a large pore size/existence of voids and a high specific surface area simultaneously due to the co-continuous structure.

In the electrode material of an embodiment of the present invention, the specific surface area measured by the BET method (BET specific surface area) is 1 to 4500 $m^2/g$. When the BET specific surface area is 1 $m^2/g$ or more, an area relative to the electrolyte is increased, and therefore sufficient performance can be achieved. The BET specific surface area is preferably 10 $m^2/g$ or more, and more preferably 30 $m^2/g$ or more. Further, by setting the BET specific surface area to 4500 $m^2/g$ or less, strength of the electrode material can be maintained, and excellent handleability can be maintained. In addition, the BET specific surface area in the present invention can be determined by measuring an adsorption isotherm by adsorption/desorption of nitrogen on the electrode material according to JIS R 1626 (1996) and calculating the measured data based on a BET equation.

In addition, in the present invention, the pore volume, the pore diameter and the BET specific surface area measured by the BJH method or the MP method, can be appropriately set by combining a control of a structure size of the co-continuous structure itself by adjusting conditions for forming the co-continuous structure or conditions for pyrolyzing in a production method described later with a control of the presence/absence and size of the fine pore by conducting activation as required and adjusting conditions for activation.

In addition, numerical value ranges of the structural period, the specific surface area, the pore volume and the porosity in the present specification are basically values in a state before being composited with a metal as described later. With respect to the electrode material having composited with a metal as described later, whether values measured after removing the metal by oxidation corrosion and dissolution using a publicly known wet etching technique are applied or not-applied to the numerical value range, is determined. That is, in the electrode material formed by compositing the porous carbon material with a metal capable of reversibly absorbing/releasing a lithium metal, if these values measured after wet etching fall within specified numerical value ranges which are specified in the present invention, it is determined that a porous carbon material having the specified numerical value range is deposited with the metal.

[Portion having Substantially No Co-Continuous Structure]

It is also a preferred embodiment that the porous carbon material of the present invention includes a portion not substantially having the co-continuous structure (hereinafter, sometimes referred to as merely "portion not having the co-continuous structure"). The term "portion not substantially having the co-continuous structure" means that a portion in which no distinct voids are observed because of having a size less than the resolution exists in an area larger than a square region in which a side corresponds to 3 times of the structural period L calculated by the X-ray as described later when a cross-section formed by the cross-section polisher method (CP method) is examined at a magnification resulting in 1±0.1 (nm/pixel).

Since carbon is closely packed in the portion not substantially having the co-continuous structure, the portion has high electrical conductivity. Because of this, the electrical conductivity and thermal conductivity can be maintained at a certain level or higher, and it is possible to rapidly discharge the heat of reaction from the system and to keep the resistance to electron transfer low. Further, the presence of the portion not having the co-continuous structure enables the resistance to compression failure to enhance. It is preferred that the proportion of the portion not having the co-continuous structure is set to 5% by volume or more, since doing so is effective in maintaining the electrical conductivity and thermal conductivity at a high level.

[Shape of Porous Carbon Material]

The shape of the porous carbon material of the present invention is not particularly limited, and examples thereof include a bulk shape, rod shape, flat plate shape, disk shape, and spherical shape. Of these, the carbon material is preferably in the form of a fiber, film, or particle. When the carbon material is in the form of a fiber or a film, it is preferred in that an electrode not using a binder can be formed, and on the other hand, when the carbon material is in the form of a particle, it is preferred in point of excellent handleability.

The term "in the form of a fiber" refers to a shape in which the average length is at least 100 times longer than the average diameter. The material may be filaments or long fibers, or may be staples, short fibers, or chopped strands. The shape of the cross-section thereof is not limited at all, and the cross-section can have any shape such as a round cross-section, a multi-leafed cross-section, e.g., triangular cross-section, a flat cross-section, or a hollow cross-section.

The average diameter of the fibers is not particularly limited, and can be determined arbitrarily in accordance with applications. The average diameter thereof is preferably 10 nm or more from the standpoint of maintaining the handleability and porousness. Further, from the standpoint of ensuring flexural rigidity to improve the handleability, the average diameter thereof is preferably 500 μm or less.

In the case of the form of a film, the thickness is not particularly limited and can be determined arbitrarily in accordance with applications. The thickness is preferably 10 nm or more when handleability is taken into account, and is preferably 5000 μm or less from the standpoint of preventing damages due to flexing.

In the case of the form of a particle, when the average particle size is 1 μm to 1 mm, it is preferred since handling is easy. Setting the average particle size to 1 μm or more facilitates the formation of the co-continuous structure. The average particle size is more preferably 2 μm or more, and even more preferably 5 μm or more. Further, by setting the average particle size to 100 μm or less, a smooth and high-density electrode can be formed. The average particle size is more preferably 80 μm or less, and even more preferably 40 μm or less.

[Electrode Material Formed by Compositing Porous Carbon Material with Metal]

The above-mentioned electrode material formed by compositing the porous carbon material with a metal capable of reversibly absorbing/releasing a lithium metal, constitutes the most preferred embodiment of the present invention. The metal capable of reversibly absorbing/releasing a lithium metal is a metal, such as Si, Sn, Ge, In, Sb, Zn, Mg, Al, Pb, etc., which forms an alloy with lithium ions. One referred to as the metal in the present specification includes oxides of the above-mentioned metals. In addition, Si and Ge strictly belong to a semiconductor, but these are included in a metal in the present specification. As the metal which forms an alloy with lithium ions, Si is preferred because of a large capacity and cost.

In addition, the expression "formed by compositing" means a state in which the metal to form an alloy with lithium ions is retained on at least a part of the surface of the porous carbon material. It is preferred that the metal is supported or contained in the carbon skeleton in the co-continuous structure portion of the porous carbon material so as to be partially exposed to the surface of the carbon skeleton. That, it is preferred that a metal is supported on the carbon skeleton or embedded in the carbon skeleton in a state in which the metal is partially exposed to the surface of the carbon skeleton. The voids of the co-continuous structure portion preferably remain as far as possible even when being composited with a metal. Specifically, the proportion of the metal in the voids is preferably 50% by volume or less, and more preferably 30% by volume or less with respect to the void volume. By keeping the proportion of the metal in the voids adequately low, break of the negative electrode material is suppressed even when a volume of a metal is expanded 3 to 4 times due to adsorption of lithium, and thereby an access path of lithium ions is ensured and a function as the electrode material can be adequately exerted.

Further, in general, since an elemental metal has a weak interaction with carbon, there is a possibility that performance may be deteriorated due to exfoliation or aggregation depending on applications or environment. In this case, it is preferred to contain a metal oxide in place of the above elemental metal or together with the elemental metal. As the metal oxide, the above-mentioned metal oxides can be used, and specific examples thereof include silicon monooxide, silicon dioxide, tin monooxide, and tin dioxide. Among these, tin monooxide, tin dioxide, and silicon oxide are preferred, and highly crystalline tin dioxide and silicon oxide having a high capacity density are more preferred.

[Electrode]

The electrode material of the present invention can be formed into an electrode by mixing one or more of the electrode materials, using the resulting mixture together with a binder, and forming an active material layer on a current collector. The electrode is preferably used as a negative electrode of a lithium ion capacitor or a lithium ion secondary battery.

In the above electrode, as a material of the current collector, aluminum, stainless steel, copper and nickel are preferred. A thickness of the current collector is usually 10 to 50 μm.

Further, examples of the binder include fluorine-based resins such as polytetrafluoroethylene and polyvinylidene fluoride; rubber-based resins such as styrene-butadiene rubber (SBR) and acrylonitrile-butadiene rubber (NBR); polypropylene, polyethylene, and fluorine-modified acrylic resins. A usage of the binder is not particularly limited, and it is preferably 1 to 20% by mass, and more preferably 2 to 10% by mass.

The active material layer constituting the electrode may further contain an electrical conducting agent such as carbon black, graphite and a metal powder; and a thickener such as carboxymethyl cellulose or Na or ammonium salt thereof, methyl cellulose, hydroxymethyl cellulose, ethyl cellulose or hydroxypropyl cellulose.

A thickness of the active material layer is not particularly limited, and it is usually 5 to 500 μm, preferably 10 to 200 μm, and more preferably 10 to 100 μm. A density of the active material layer is preferably 0.50 to 1.50 g/cm$^3$, and more preferably 0.70 to 1.20 g/cm$^3$ for use in a lithium ion capacitor. A density of the active material layer is preferably 1.50 to 2.00 g/cm$^3$, and more preferably 1.60 to 1.90 g/cm$^3$ for use in a lithium ion secondary battery. When the thickness and the density of the active material layer are in the above-mentioned ranges, liquid retention of an electrolytic solution and contact resistance of the active material can be simultaneously pursued at a high level, and a device having a high capacity and low resistance can be attained.

[Lithium-Ion Capacitor, Lithium-Ion Battery]

A lithium-ion capacitor of the present invention can be prepared by using the above-mentioned electrode as a negative electrode, and using a positive electrode active material such as an activated carbon or a polyacene-based substance, and a positive electrode material obtained by mixing a conducting agent with a binder.

Further, the lithium ion secondary battery can be prepared by using the above-mentioned electrode as a negative electrode, and using a positive electrode material obtained by mixing a positive electrode active material, a conduction aid and a binder. Examples of the positive electrode active material of the lithium ion secondary battery include lithium-transition metal composite oxide such as lithium-cobalt oxide, lithium-nickel oxide and lithium-manganese oxide; transition metal oxide such as manganese dioxide; and carbonaceous material such as graphite fluoride. These positive electrode active materials can be used alone or in combination of two or more thereof.

As a conductive additive of the positive electrode of the lithium ion secondary battery, for example, graphites, acetylene black, Ketjen Black, carbon nanofiber, needle cokes, or the like can be used; however, the conductive additive is not limited to these.

Examples of a binder for the lithium ion secondary battery include, but not limited to, PVDF, ethylene-propylene-diene copolymer (EPDM), SBR, acrylonitrile-butadiene rubber (NBR), fluorine-contained rubber, and the like.

The electrolyte is usually used in a state of an electrolytic solution in which the electrolyte is dissolved in a solvent. In the present invention, as the electrolyte, one capable of producing lithium ions is preferred, and specific examples thereof include LiClO$_4$, LiAsF$_6$, LiBF$_4$, LiPF$_6$, LiN(C$_2$F$_5$SO$_2$)$_2$, LiN(CF$_3$SO$_2$)$_2$, LiN(FSO$_2$)$_2$ and the like. These electrolytes can be used alone or in combination of two or more thereof.

As a solvent for dissolving the electrolyte, aprotic organic solvents are preferred, and specific examples thereof include dimethyl carbonate, diethyl carbonate, ethylmethyl carbonate, γ-butyrolactone, acetonitrile, dimethoxyethane, tetrahydrofuran, ethylene carbonate, propylene carbonate, butylene carbonate, 1-fluoroethylene carbonate, 1-(trifluoromethyl) ethylene carbonate, dioxolan, methylene chloride, sulfolane, and the like. These solvents can be used alone or in combination of two or more thereof.

A concentration of the electrolyte in the electrolytic solution is set preferably to 0.1 mol/L or more, and more preferably to 0.3 to 2.0 mol/L in order to decrease internal resistance based on an electrolytic solution. Further, the electrolytic solution may contain an additive such as vinylene carbonate, vinylethylene carbonate, succinic anhydride, maleic anhydride, propanesultone and diethyl sulfone.

The electrolyte may be in the form of a gel or in the form of a solid substance aimed at preventing liquid leakage.

When the electrolyte is used in a state of an electrolytic solution, a separator is generally provided between the positive electrode and the negative electrode in order to electrically insulate so as to avoid physical contact between the positive electrode and the negative electrode, and retain an electrolytic solution. Examples of the separator include a non-woven cloth or a porous film made of cellulose rayon, polystyrene, polypropylene, polyamide, polyester, or polyimide as a raw material.

Examples of the structures of these lithium-ion capacitor and lithium-ion battery include a laminate type cell in which plate-shaped 3 or more positive electrodes and 3 or more negative electrodes are laminated with a separator interposed therebetween to form an electrode, and the electrode is housed in a package film and sealed; and a wound type cell in which band-shaped positive electrode and negative electrode are wound with a separator interposed therebetween to form an electrode, and the electrode is housed in a prismatic or cylindrical container.

<Production Method of Electrode Material>

A porous carbon material used for the electrode material of the present invention can be produced, for example, by a step in which 10 to 90 wt % of a carbonizable resin and 90 to 10 wt % of an eliminable resin are brought into a compatibly mixed state to obtain a resin mixture (step 1); a step in which the resin mixture in a compatibly mixed state is caused to undergo phase separation and the separated phases are fixed (step 2); and a step in which the fixed material is carbonized by pyrolysis under heat (step 3), and a step in which a carbide is activated (step 4) may be performed as required.

[Step 1]

The step 1 is a step in which 10 to 90 wt % of a carbonizable resin and 90 to 10 wt % of an eliminable resin are brought into a compatibly mixed state to obtain a resin mixture.

Herein, the carbonizable resin is a resin which carbonizes upon pyrolysis and remains as a carbon material, and a resin having the carbonization yield of 40% or more is preferred. For example, both a thermoplastic resin and a thermosetting resin can be used as the carbonizable resin, and examples of the thermoplastic resin include polyphenylene oxide, polyvinyl alcohol, polyacrylonitrile, phenolic resins, and wholly aromatic polyesters. Examples of the thermosetting resin include unsaturated polyester resins, alkyd resins, melamine resins, urea resins, polyimide resins, diallyl phthalate resins, lignin resins, and urethane resins. Polyacrylonitrile and phenolic resins are preferred, and polyacrylonitrile is more preferred from the standpoints of cost and productivity. Particularly, in the present invention, it is a preferred embodiment to use polyacrylonitrile since a high specific surface area is attained even in the polyacrylonitrile. These resins may be used either alone or in a mixed state. The carbonization yield referred to herein means a yield obtained by measuring changes in weight of a resin at the time of raising a temperature at a rate of 10° C./min in a nitrogen atmosphere by a thermogravimetric (TG) technique, and dividing a difference between a weight at room temperature and a weight at 800° C. by the weight at room temperature.

Meanwhile, the eliminable resin is a resin which can be removed after the step 2 to be described later, and can be preferably removed in at least any of the following stages: simultaneously with a treatment for imparting infusibility; after the treatment for imparting infusibility; and simultaneously with the pyrolysis. A removal rate of a resin is preferably 80 wt % or more, and more preferably 90 wt % or more when the resin finally becomes a porous carbon material. A method of removing the eliminable resin is not particularly limited, and suitable methods include: a method in which the eliminable resin is chemically removed, for example, by conducting depolymerization using a chemical; a method in which the eliminable resin is removed by a solvent capable of dissolving the eliminable resin; and a method in which the resin mixture is heated to lower the molecular weight of the eliminable resin by thermal decomposition, thereby removing the eliminable resin. These techniques can be used alone or in combination thereof, and in the case of using a combination, the techniques may be simultaneously performed or separately performed.

As the method in which the resin is chemically removed, a method in which the resin is hydrolyzed using an acid or an alkali is preferred from the standpoints of economic efficiency and handleability. Examples of resins which are susceptible to hydrolysis by acids or alkalis include polyesters, polycarbonates, and polyamides.

Suitable examples of the method in which the eliminable resin is removed by a solvent capable of dissolving the eliminable resin include: a method in which the solvent is continuously supplied to the carbonizable resin and eliminable resin which have been mixed, thereby dissolving and removing the eliminable resin; and a method in which the solvent and the resins are mixed batchwise to dissolve and remove the eliminable resin.

Specific examples of the eliminable resin which are suitable for the method of removing by a solvent include polyolefins such as polyethylene, polypropylene, and polystyrene, acrylic resins, methacrylic resins, polyvinylpyrrolidone, aliphatic polyesters, and polycarbonates. Particularly, from a standpoint of solubility in a solvent, such an eliminable resin is more preferably an amorphous resin, and examples thereof include polystyrene, methacrylic resins, polycarbonates, and polyvinylpyrrolidone.

Examples of the method in which the eliminable resin is lowered in molecular weight by thermal decomposition and removed thereby include: a method in which the carbonizable resin and eliminable resin which have been mixed are heated batchwise to decompose the eliminable resin; and a method in which the carbonizable resin and eliminable resin which have been continuously mixed are continuously supplied to a heating source and heated to thereby decompose the eliminable resin.

It is preferable that the eliminable resin is, among those resins, a resin which disappears in the step 3 described later, through thermal decomposition when the carbonizable resin is carbonized by pyrolysis. It is preferable that the eliminable resin is a resin which does not undergo a large chemical change when the carbonizable resin is subjected to the treatment for imparting infusibility described later, and which, after pyrolysis, gives a carbonization yield of less than 10%. Specific examples of such eliminable resins include polyolefins such as polyethylene, polypropylene, and polystyrene, acrylic resins, methacrylic resins, polyacetals, polyvinylpyrrolidone, aliphatic polyesters, aromatic polyesters, aliphatic polyamides, and polycarbonates. These resins may be used either alone or in a mixed state.

In the step 1, the carbonizable resin and the eliminable resin are brought into a compatibly mixed state to obtain a resin mixture (polymer alloy). The expression "brought into a compatibly mixed state" herein means that by suitably selecting conditions regarding temperature and/or solvent, a state that no structure in which the carbonizable resin and the eliminable resin are present as separate phases is observed with an optical microscope, is produced.

The carbonizable resin and the eliminable resin may be brought into a compatibly mixed state by mixing the resins alone with each other or by further adding a solvent thereto.

Examples of a system in which a plurality of resins have been brought into a compatibly mixed state include: a system which shows a phase diagram of the upper-limit critical solution temperature (UCST) type in which the resins are in a phase-separated state at low temperatures but form a single phase at high temperatures; and a system which conversely shows a phase diagram of the lower-limit critical solution temperature (LCST) type in which the resins are in a phase-separated state at high temperatures but form a single phase at low temperatures. Furthermore, particularly in the case of a system in which at least one of the carbonizable resin and the eliminable resin has been dissolved in a solvent, suitable examples include one in which the phase separation described later is induced by the infiltration of a nonsolvent.

The solvent to be added is not particularly limited, and preferred is such a solvent that the absolute value of the difference between the solubility parameter (SP value) thereof and the average of the SP values of the carbonizable resin and eliminable resin is 5.0 or less, the absolute value being an index to dissolving properties. It is known that the smaller the absolute value of the difference from the average of the SP values is, the higher the dissolving properties are, and therefore it is preferred that the difference is zero. Meanwhile, the larger the absolute value of the difference from the average of the SP values is, the lower the dissolving properties are and the more the compatibly mixed state of the carbonizable resin and eliminable resin is difficult to attain. In view of this, the absolute value of the difference from the average of the SP values is preferably 3.0 or less, and most preferably 2.0 or less.

Specific examples of combinations of the carbonizable resin and eliminable resin to be brought into a compatibly mixed state, in the case where the system contains no solvent, include polyphenylene oxide/polystyrene, polyphenylene oxide/styrene-acrylonitrile copolymer, wholly aromatic polyester/polyethylene terephthalate, wholly aromatic polyester/polyethylene naphthalate, and wholly aromatic polyester/polycarbonate. Specific examples of the combinations, in the case where the system contains a solvent, include polyacrylonitrile/polyvinyl alcohol, polyacrylonitrile/polyvinylphenol, polyacrylonitrile/polyvinylpyrrolidone, polyacrylonitrile/polylactic acid, polyvinyl alcohol/vinyl acetate-vinyl alcohol copolymer, polyvinyl alcohol/polyethylene glycol, polyvinyl alcohol/polypropylene glycol, and polyvinyl alcohol/starch.

Methods for mixing the carbonizable resin with the eliminable resin are not limited, and various publicly known mixing techniques can be employed so long as even mixing is possible therewith. Specific examples thereof include a rotary mixer having stirring blades and a kneading extruder with screws.

It is also a preferred embodiment that the temperature (mixing temperature) at which the carbonizable resin and the eliminable resin are mixed together is not lower than a temperature at which both the carbonizable resin and the eliminable resin soften. As the temperature at which the resins soften, either the melting point of the carbonizable resin or eliminable resin in the case where the resin is a crystalline polymer or the glass transition temperature thereof in the case where the resin is an amorphous resin may be appropriately selected. By setting the mixing temperature at a temperature not lower than the temperature at which both the carbonizable resin and the eliminable resin soften, the viscosity of the two resins can be lowered and, hence, more efficient stirring and mixing are possible. There is no particular upper limit on the mixing temperature. The mixing temperature is preferably 400° C. or lower from the standpoint of preventing resin deterioration due to thermal degradation, thereby obtaining a precursor for the carbon material, which has excellent quality.

In the step 1, 10 to 90 wt % of the carbonizable resin is mixed with 90 to 10 wt % of the eliminable resin. In the case where the proportions of the carbonizable resin and eliminable resin are within those ranges, an optimal void size and an optimal porosity can be arbitrarily designed, and therefore those ranges are preferred. When the proportion of the carbonizable resin is 10 wt % or more, it is possible to retain mechanical strength in the carbonized material, and it is also possible to improve yield, and therefore the proportion is preferred. Meanwhile, when the proportion of the carbonizable material is 90 wt % or less, the eliminable resin can efficiently form voids, and therefore the proportion is preferred.

A mixing ratio between the carbonizable resin and the eliminable resin can be arbitrarily selected within the above range while taking account of the compatibility of each material. Specifically, since compatibility between resins generally becomes worse as the ratio therebetween approaches 1:1, preferred embodiments in the case where a system having not so high compatibility has been selected as starting materials include one in which the compatibility is improved by making the mixture approach to the so-called partial composition by increasing or reducing the amount of the carbonizable resin. Further, in the case where the eliminable resin is increased, the void tends to increase.

It is also a preferred embodiment that a solvent is added when the carbonizable resin and the eliminable resin are mixed with each other. The addition of a solvent not only lowers the viscosity of the carbonizable resin and eliminable resin to facilitate molding but also makes the carbonizable resin and the eliminable resin easy to be brought into a compatibly mixed state. The solvent referred to herein is not also particularly limited, and any solvent which is liquid at ordinary temperature and in which at least one of the carbonizable resin and the eliminable resin is soluble or swellable may be used. It is a more preferred embodiment that a solvent in which both the carbonizable resin and the eliminable resin dissolve is used because the compatibility between both resins can be improved.

It is preferred that the amount of the solvent to be added is 20 wt % or more with respect to the total weight of the carbonizable resin and the eliminable resin, from the standpoints of improving the compatibility between the carbonizable resin and the eliminable resin and lowering the viscosity thereof to improve the flowability. Further, on the other hand, from the standpoint of the cost of the recovery and recycling of the solvent, the amount of the solvent to be added is preferably 90 wt % or less with respect to the total weight of the carbonizable resin and the eliminable resin.

[Step 2]

The step 2 is a step in which the resin mixture which has been brought into a compatibly, mixed state in the step 1 is caused to undergo phase separation to form a microstructure and the separated phase is fixed.

Phase separation of the carbonizable resin and eliminable resin which have been mixed together can be induced by various physical, and chemical techniques, and examples of a method of inducing the phase separation include: a heat-induced phase separation method in which phase separation is induced by a temperature change; a nonsolvent-induced phase separation method in which phase separation is induced by adding a nonsolvent; a reaction-induced phase separation method in which phase separation is induced using a chemical reaction; a shear-induced phase separation method; an orientation-induced phase separation method; and the like. Among these methods, the heat-induced phase separation method and the nonsolvent-induction phase separation method are preferred in point of being able to easily produce the porous material of the present invention. Particularly, the phase separation through spinodal decomposition is preferred since the size of a void can be arbitrarily controlled by the condition of temperature or the like in the spinodal decomposition.

These phase separation methods can be used alone or in combination thereof. Specific examples of methods in the case of using a combination include: a method in which the mixture is passed through a coagulating bath to cause nonsolvent-induced phase separation and the mixture is then heated to cause heat-induced phase separation; a method in which the nonsolvent-induced phase separation and the heat-induced phase separation are simultaneously caused by controlling the temperature of a coagulating bath; and a method in which the material ejected from a spinning nozzle is cooled to cause heat-induced phase separation and is then brought into contact with a nonsolvent.

The phase separation is preferably conducted by a method accompanied with no chemical reaction. The expression "accompanied with no chemical reaction" means that either of the carbonizable resin and eliminable resin which have been mixed undergoes no change in primary structure before and after the mixing. The term "primary structure" represents the chemical structure which constitutes the carbonizable resin or the eliminable resin. By being accompanied with no chemical reaction such as polymerization in inducing the phase separation, changes in characteristics of a resin such as significant improvement in elastic modulus is suppressed, and the resin can be easily formed into an optional structural body such as a fiber, a film or the like.

[Removal of Eliminable Resin]

The resin mixture in which a microstructure resulting from the phase separation has been fixed in the step 2, is subjected to removal of the eliminable resin before being subjected to the carbonization step (step 3), or simultaneously with the carbonization step, or in both thereof. Methods for the removal are not particularly limited, and any method may be employed as long as the eliminable resin can be removed thereby. Specifically, suitable methods include: a method in which the eliminable resin is chemically decomposed and lowered in molecular weight using an acid, alkali, or enzyme and is removed thereby; a method in which the eliminable resin is dissolved away by a solvent capable of dissolving the eliminable resin; and a method in which the eliminable resin is depolymerized using radiation, such as electron beams, gamma rays, ultraviolet rays, or infrared rays, or heat to thereby remove the eliminable resin.

Particularly, in the case where the eliminable resin can be removed by thermal decomposition, a heat treatment may be conducted beforehand at such a temperature that at least 80 wt % of the eliminable resin disappears, or the eliminable resin may be gasified by thermal decomposition and then removed in the carbonization step (step 3) or in the treatment for imparting infusibility described later. It is a more suitable embodiment that the method is selected in which the eliminable resin is gasified by thermal decomposition and then removed simultaneously with heat treatment in the carbonization step (step 3) or in the treatment for imparting infusibility described later, from the standpoint of reducing the number of steps to enhance the productivity.

[Treatment for Imparting Infusibility]

It is preferred that a precursor material being the resin mixture in which a microstructure resulting from the phase separation has been fixed in the step 2, is subjected to the treatment for imparting infusibility before being subjected to the carbonization step (step 3). Methods for the treatment for imparting infusibility are not particularly limited, and publicly known methods can be used. Specific examples of the methods include: a method in which the resin mixture is heated in the presence of oxygen to thereby cause oxidative crosslinking; a method in which the resin mixture is irradiated with high-energy rays such as electron beams or gamma rays to form a crosslinked structure; and a method in which the resin mixture is impregnated with or mixed with a substance having a reactive group to form a crosslinked structure. Among these methods, the method in which the resin mixture is heated in the presence of oxygen to thereby cause oxidative crosslinking is preferred because the process is simple and production cost can be kept low. These techniques can be used alone or in combination thereof, and the techniques may be used either simultaneously or separately.

The heating temperature in the method in which the resin mixture is heated in the presence of oxygen to thereby cause oxidative crosslinking is preferably 150° C. or higher from the standpoint of causing the crosslinking reaction to proceed efficiently, and is preferably 350° C. or lower from the standpoint of preventing the yield from being impaired by a weight loss due to the thermal decomposition, combustion, etc. of the carbonizable resin.

An oxygen concentration during the treatment is not particularly limited. It is preferred to supply a gas having an oxygen concentration of 18% or higher, in particular, to supply air as it is, because use of such a gas makes it possible to reduce the production cost. A method of supplying a gas is not particularly limited. Examples thereof include a method in which air is supplied as it is to the heating device and a method in which pure oxygen is supplied to the heating device using a bombe or the like.

Examples of the method in which the resin mixture is irradiated with high-energy rays such as electron beams or gamma rays to form a crosslinked structure include a method in which a commercially available electron beam generator or gamma ray generator is used to irradiate the carbonizable resin with electron beams or gamma rays to thereby induce crosslinking. A lower limit of the irradiation intensity is preferably 1 kGy or higher from the standpoint of efficiently introducing a crosslinked structure by the irradiation, and the irradiation intensity is preferably 1000 kGy or less from the standpoint of preventing the material strength from being deteriorated due to a decrease in molecular weight by to cleavage of the main chain.

Examples of the method in which the resin mixture is impregnated with or mixed with a substance having a reactive group to form a crosslinked structure include : a method in which the resin mixture is impregnated with a low-molecular-weight compound having a reactive group, followed by heating or irradiating with high-energy rays to cause a crosslinking reaction to proceed; and a method in which a low-molecular-weight compound having a reactive group is mixed beforehand, followed by heating or irradiating with high-energy rays to cause a crosslinking reaction to proceed.

A suitable method is to conduct the removal of the eliminable resin simultaneously with the treatment for imparting infusibility, because the benefit of a cost reduction due to the reduction in the number of steps can be expected.

[Step 3]

The step 3 is a step of pyrolyzing and carbonizing the resin mixture in which a microstructure resulting from the phase separation has been fixed in the step 2, or the carbonizable resin in the case where the eliminable resin has been removed to thereby obtain a carbide.

It is preferred that the pyrolysis is conducted by heating the resin mixture to 600° C. or higher in an inert gas atmosphere. Herein, the term "inert gas" refers to a gas which is chemically inactive at the time of heating, and specific examples thereof include helium, neon, nitrogen, argon, krypton, xenon, and carbon dioxide. It is preferred from the standpoint of economical efficiency that nitrogen or argon is used among these. When the carbonization temperature is set to 1500° C. or higher, it is preferred to use argon from the standpoint of inhibiting the formation of nitrides.

The flow rate of the inert gas is not limited as long as the oxygen concentration within the heating device can be sufficiently lowered, and it is preferred to appropriately select an optimal value in accordance with the size of the heating device, amount of the feed material to be supplied, heating temperature, etc. There is no particular upper limit on the flow rate. It is preferable that the flow rate of the inert gas is suitably set in accordance with a temperature distribution or the design of the heating device, from the standpoints of economical efficiency and of reducing temperature differences within the heating device. Furthermore, in the case where the gases which generate during the carbonization can be sufficiently discharged from the system, a porous carbon material having excellent quality can be obtained, and therefore this embodiment is more preferred. It is, therefore, preferred to determine the flow rate of the inert gas so that the concentration of the generated gases in the system is 3000 ppm or less.

There is no upper limit on the temperature at which the resin mixture is heated. Temperatures not higher than 3000° C. are preferred from the standpoint of economical efficiency because the equipment requires no special processing. Further, in order to increase the BET specific surface area, the heating temperature is preferably 1500° C. or lower, and more preferably 1000° C. or lower.

With respect to heating methods in the case where the carbonization treatment is continuously conducted, a method in which the material is continuously fed to and taken out from the heating device kept at a constant temperature, using rollers, conveyor or the like is preferred because the productivity can be enhanced.

On the other hand, when a batch treatment is conducted in a heating device, there is no particular lower limit on the temperature raising rate and temperature lowering rate. The rates of 1° C./min or higher are preferred because the time period required for the temperature raising and temperature lowering can be shortened to thereby enhance the productivity. Further, there is no particular upper limit on the heating rate and cooling rate. It is preferred to employ, as the upper limit of the rates of temperature raising and temperature lowering, a rate which is lower than the thermal shock resistance of the material that constitutes the heating device.

[Activation Treatment]

The carbide obtained in the step 3 is preferably subjected to the activation treatment as required. In the present invention, particularly when the specific surface area has to be increased, it is preferred to conduct an activation treatment.

A method of activation treatment is not particularly limited, and examples thereof include a gas activation method, a chemical activation method or the like. The gas activation method is a method in which oxygen, steam, carbon dioxide, air or combustion exhaust gas is used as an activation agent and a carbide is heated at a temperature of 400° C. to 1500° C., preferably 500° C. to 900° C. for several minutes to several hours to form fine pores. Further, the chemical activation method is a method in which as an activation agent, one or more of zinc chloride, iron chloride, calcium phosphate, calcium hydroxide, potassium hydroxide, magnesium carbonate, sodium carbonate, potassium carbonate, sulfuric acid, sodium sulfate, potassium sulfate and the like, are used and a carbide is heated for several minutes to several hours, and the resulting carbide is washed with water or hydrochloric acid as required, and dried after pH adjustment.

When the activation is made more proceed or an amount of the activation agent to be mixed is increased, in general, the BET specific surface area tends to increase and the pore size tends to increase. Further, the amount of the activation agent to be mixed is set to preferably 0.5 part by weight or more, more preferably 1.0 part by weight or more, and even more preferably 4 parts by weight or more with respect to 1 part by weight of an intended carbon raw material. An upper limit of the amount of the activation agent to be mixed is not particularly limited; however, it is commonly 10 parts by weight or less. Further, the pore size by the chemical activation method tends to be increased more than the pore size by the gas activation method.

In the present invention, the chemical activation method is preferably employed because it can increase the pore size and can increase the BET specific surface area. Particularly, a method of activating with an alkaline chemical such as calcium hydroxide, potassium hydroxide or potassium carbonate is preferably employed.

In the case of activation with the alkaline chemical, an amount of an acidic functional group tends to increase and it may be not preferred. In this case, the acidic functional group can be reduced by heating the carbide in a nitrogen atmosphere.

[Pulverization Treatment]

As described above, it is a preferred embodiment that the porous carbon material of the present invention is in the form of a powder. In the case where the powdery porous carbon material is produced, a pulverization treatment is preferably conducted after any of the above-mentioned steps or treatments. A conventionally publicly known method can be selected for the pulverization treatment and it is preferable to appropriately select the method in accordance with the particle size to be attained through the pulverization treatment and the treatment amount. Examples of the method for the pulverization treatment include a ball mill, bead mill, and jet mill. The pulverization treatment may be continuous or batchwise. The pulverization treatment is preferably continuous from the standpoint of production efficiency. The filling material to be filled into the ball mill is appropriately selected. It is preferred that a material based on a metal oxide, such as alumina, zirconia, or titania, or a material obtained by coating stainless steel, iron or the like as cores with a nylon, polyolefin, fluorinated polyolefin or the like is used for applications where inclusion of a metallic material is undesirable. For other applications, use of a metal such as stainless steel, nickel, or iron is suitably used.

It is also a preferred embodiment from the standpoint of increasing the efficiency of pulverization that a pulverization aid is used during the pulverization. The pulverization aid is selected arbitrarily from among water, alcohols, glycols, ketones, etc. Ethanol and methanol are preferred alcohols from the standpoints of ease of availability and cost, and in the case of using a glycol, ethylene glycol, diethylene glycol, propylene glycol or the like is preferable. In the case of using a ketone, acetone, ethyl methyl ketone, diethyl ketone or the like is preferred.

Sizes of particles of the carbide having undergone the pulverization treatment are leveled by classification and classified carbide can form a uniform structural body in, for example, a filling material or an additive to a paste. Hence, it is possible to stabilize the efficiency of filling and the step of paste application. Consequently, it can be expected to increase the production efficiency to attain a cost reduction. With respect to a particle diameter, it is preferred to appropriately select the diameter in accordance with applications of the pulverized carbide.

[Compositing of Metal]

A method of compositing the porous carbon material with a metal is not particularly limited, and examples thereof include a method in which a metal is supported after the porous carbon material is prepared as described above, or a method of making a starting material or an intermediate contain a metal at the stage of a starting material or an intermediate before becoming carbon.

In the case where a metal is supported on a porous carbon material after production, examples thereof include a method in which a solution including a metal chloride and a porous carbon material are mixed to impregnate the porous carbon material with the solution, the impregnated porous carbon material is subjected to a desolvation treatment to support the metal chloride in pores or voids, and then a metal is deposited by a dechlorination reaction to support a metal. Specifically, a liquid of silicon chloride such as $SiCl_4$ and a carbon material are mixed to impregnate the carbon material with the liquid, and then silicon chloride is reduced by a strong reducing agent such as lithium aromatic complex and sodium aromatic complex, and thereby silicon can be supported through a dechlorination reaction.

Further, in the case of making the porous carbon material contain a metal, it is possible to make a starting material or an intermediate of the porous carbon material contain a metal, a metal oxide or a precursor thereof at any stage before pyrolysis. Specifically, a step of mixing a carbon material or a precursor material of the carbon material with a precursor of metal oxide is provided at either stage prior to the step 3 (carbonization step). Particularly, it is preferred to mix a metal in a resin mixture at a stage of the step 1 or the step 2. In accordance with this method, the effect in which a step of supporting a metal can be omitted, a metal or the like is easily dispersed, and a metal is hardly exfoliated since it is partially embedded in the carbon material, can be expected.

As described above, silicon oxide is preferred as a metal oxide. When an electrode material containing silicon oxide is prepared, it is preferred to make a starting material or an intermediate of the porous carbon material contain a precursor of silicon oxide. Such a precursor of silicon oxide is not particularly limited, and a compound obtained by hydrolyzing a compound such as silica, tetraalkoxysilane, trialkoxysilane, and oligomer thereof, or tetrachlorosilane, and deriving hydrolysate, can be used. Considering availability and economic efficiency, silica is preferred.

EXAMPLES

Hereinafter, preferred examples of the present invention will be described. These descriptions should not limit the present invention at all.

<Evaluation Technique>

[Structural Period of Co-Continuous Structure Portion]

(1) X-Ray Scattering Method

A porous carbon material was sandwiched between specimen plates, and the position of a CuKα line source (wavelength λ=0.154184 nm) and the positions of the specimen and a two-dimensional detector were regulated so that information on scattering angles less than 10 degrees was obtained from the X-ray source obtained from the CuKα line source. From the image data (brightness information) obtained from the two-dimensional detector, the data on the central portion which had been affected by a beam stopper were excluded. Radius vectors from the beam center were set, and the values of brightness for the range of 360° at angular intervals of 1° were summed up to obtain a scattered-light-intensity distribution curve. From the scattering angle θ corresponding to the local maximum value of a peak in the curve obtained, the structural period L of the co-continuous structure portion was obtained using the following equation.

(2) X-Ray CT Method

When the structural period was 1 μm or more and the peak of X-ray scattering intensity was not observed, a continuously rotating image was taken with 0.3° step in a range of not less than 180° using an X-ray microscope to obtain a CT image. The obtained CT image was subjected to Fourier transformation to give a graph of scattering angle θ and scattered-light intensity, a scattered-light-intensity distribution curve, and the structural period L of the co-continuous structure portion was then obtained using the following equation by the same method as above.

$$L=\lambda/(2 \sin \theta)$$

Structural period: L, λ: wavelength of incident X-rays, θ: scattering angle corresponding to a local maximum value of peak values of the scattering intensity

[Average Porosity]

A carbon material was embedded in a resin, and a cross-section of the electrode material was exposed by using a razor blade or the like. Using SM-09010, manufactured by JEOL Ltd., the specimen surface was irradiated with argon ion beams at an accelerating voltage of 5.5 kV to etch the surface. A central part of the resultant cross-section of the electrode material was examined with a scanning secondary-electron microscope at a magnification regulated so as to result in 1±0.1 (nm/pixel) and at a resolution of 700000 pixels or higher, and a square examination region for calculation in which each side had 512 pixels was set in the resulting image. The average porosity was calculated using the following equation, in which A was the area of the examination region and B was the area of the pores or embedded portion.

$$\text{Average porosity}(\%)=B/A\times100$$

[BET Specific Surface Area, Fine Pore Diameter]

Using "BELSORP-18PLUS-HT" manufactured by MicrotracBEL Corp., a specimen was deaerated at 300° C. for about 5 hours under a reduced pressure, and then nitrogen adsorption-desorption of the specimen at a temperature of 77 K was measured by a multipoint method using liquid nitrogen. The specific surface area measurement was performed by a BET method and pore distribution analysis (pore diameter, pore volume) was performed by a MP method or a BJH method.

Example 1

Into a separable flask were introduced 70 g of polyacrylonitrile (Mw: 150000, carbon yield: 58%) manufactured by Polysciences, Inc., 70 g of polyvinylpyrrolidone (Mw: 40000) manufactured by Sigma Aldrich Co., Ltd., and 400 g of dimethyl sulfoxide (DMSO) manufactured by Wakenyaku Co. Ltd., as a solvent, and the contents were heated at 150° C. for 3 hours with stirring and refluxing, thereby preparing a uniform and transparent solution. In this solution, the concentration of the polyacrylonitrile and the concentration of the polyvinylpyrrolidone were 13 wt % each.

The DMSO solution obtained was cooled to 25° C. and then ejected at a rate of 3 mL/min from a one-orifice nozzle having an orifice diameter of 0.6 mm, and the extrudate was led into a pure-water coagulating bath kept at 25° C., subsequently taken off at a rate of 5 m/min, and accumulated in a vat to thereby obtain raw fibers. In this operation, an air gap was set at 5 mm, and the length of immersion in the coagulating bath was 15 cm. The raw fibers obtained were translucent and had undergone phase separation.

The raw fibers obtained were dried for 1 hour in a circulating dryer kept at 25° C., thereby removing the water present on the fiber surface. Thereafter, vacuum drying was conducted at 25° C. for 5 hours to obtain dried raw fibers as a precursor material.

The raw fibers as a precursor material were thereafter introduced into an electric furnace kept at 250° C. and heated in an oxygen atmosphere for 1 hour, thereby performing a treatment for imparting infusibility. The raw fibers which had undergone the treatment for imparting infusibility changed to black in color.

The infusible raw fibers obtained were subjected to a carbonization treatment under the conditions of a nitrogen flow rate of 1 L/min, temperature raising rate of 10° C./min, maximum temperature of 850° C., and holding time of 1 minute, thereby obtaining carbon fibers having a co-continuous structure. A cross-section of the carbon fiber was analyzed, and consequently a fiber diameter was 145 μm, and a thickness of a skin layer being a portion not having the co-continuous structure was 5 μm. Furthermore, an even co-continuous structure was formed in the fiber center part.

Then, the carbon fibers were pulverized using a ball mill to obtain a porous carbon material in the form of a particle.

In the resulting carbon particles, the average porosity of the co-continuous structure portion was 42% and the structural period was 78 nm. Further, the carbon particle has a structure in which the portion not having the co-continuous structure is contained in part of the particle. The BET specific surface area was 41 $m^2/g$, and the pore volume of the fine pore, measured by the BJH method, was 0.15 $cm^3/g$.

Next, the porous carbon material, carboxymethyl cellulose, and acetylene black were mixed in a mass ratio of 100:5:5, and the resulting mixture was stirred and mixed with a planetary centrifugal mixer. Then, the mixture was applied onto a copper foil having a thickness of 20 μm, and thereafter vacuum drying was conducted at 110° C. for 1 hour. After vacuum drying, the carbon material was pressure-formed by roll-pressing and punched out in a diameter of 13 mm to obtain an electrode for lithium ion secondary batteries.

The electrode (negative electrode) for lithium ion secondary batteries thus obtained, a separator (porous film made of polypropylene), and a lithium metal (diameter: 12 mm, thickness: 1 mm) as a working electrode were arranged at a predetermined position in a 2032 type coin cell manufactured by Hohsen Corporation in this order. Moreover, lithium perchlorate was dissolved in a mixed solution of ethylene carbonate and diethylene carbonate (volume ratio 1:1) so as to have a concentration of 1 mol/L to obtain an electrolytic solution, and the electrolytic solution was injected to prepare a lithium ion secondary battery.

The results are shown in Table 1.

Example 2

The porous carbon material obtained in Example 1, $SiCl_4$ liquid and a carbon material were mixed to impregnate the porous carbon material with $SiCl_4$, and then $SiCl_4$ was reduced to obtain a silicon-supported electrode material. An electrode for lithium ion secondary batteries and a lithium ion secondary battery were prepared in the same manner as in Example 1 except for using this silicon-supported electrode material in place of the porous carbon material. The results are shown in Table 1.

Example 3

In Example 1, colloidal silica (manufactured by NISSAN CHEMICAL INDUSTRIES, LTD., "SNOWTEX") was mixed with a solution composed of polyacrylonitrile and polyvinylpyrrolidone to obtain a silicon oxide-containing electrode material. In the resulting electrode material, as with Example 1, the average porosity of the co-continuous structure portion was 40% and the structural period was 76 nm. Further, the carbon particle has a structure in which the portion not having the co-continuous structure is contained in part of the particle. An electrode for lithium ion secondary batteries and a lithium ion secondary battery were prepared in the same manner as in Example 1 except for using this silicon oxide-containing electrode material in place of the porous carbon material. The results are shown in Table 1.

Comparative Example 1

An electrode for lithium ion secondary batteries and a lithium ion secondary battery were prepared in the same manner as in Example 1 except for using artificial graphite having the BET specific surface area of 10 $m^2/g$ in place of the porous carbon of Example 1. The results are shown in Table 1.

TABLE 1

| | | Example 1 | Example 2 | Example 3 | Comparative Example 1 |
|---|---|---|---|---|---|
| Continuous Void Structure | Presence/Absence | Present | Present | Present | Absent |
| | Structural Period (nm) | 78 | 78 | 76 | — |
| | Average Porosity (%) | 42 | 42 | 30 | — |
| BET Specific Surface Area ($m^2/g$) | | 41 | 41 | 42 | 10 |
| Volume (BJH method) ($cm^3/g$) | | 0.15 | 0.15 | 0.12 | 0.01 |
| Evaluation of Electric Generation | Initial Discharge Capacity (mAh/g) | 300 | 725 | 650 | 200 |
| | Capacity Retention Ratio after 10 Cycle (%) | 86 | 98 | 95 | 10 |

The invention claimed is:

1. An electrode material comprising a porous carbon material having a co-continuous structure portion in which a carbon skeleton and voids form a continuous structure, wherein in the porous carbon material, the specific surface area measured by the BET method is 1 to 4500 $m^2/g$, and the pore volume measured by the BJH method is 0.01 to 2.0 $cm^3/g$, wherein a structural period of the co-continuous structure portion of the porous carbon material is 0.002 to 3 μm.

2. The electrode material according to claim 1, wherein a volume ratio (Vm/Vb) of a pore volume (Vm) measured by a MP method to a pore volume (Vb) measured by the BJH method of the porous carbon material is 1.0 or less.

3. The electrode material according to claim 1, wherein a raw material of the porous carbon material is mainly polyacrylonitrile.

4. An electrode material formed by compositing the porous carbon material according to claim 1 with a metal capable of reversibly absorbing/releasing a lithium metal.

5. The electrode material according to claim 4, wherein the metal capable of reversibly absorbing/releasing a lithium metal is at least one selected from the group consisting of Si, Sn, Ge, In, Sb, Zn, Mg, Al, Pb, and oxides thereof.

6. The electrode material according to claim 4, wherein the metal capable of reversibly absorbing/releasing a lithium metal is supported or contained in the carbon skeleton in the co-continuous structure portion of the porous carbon material so as to be partially exposed to the surface of the carbon skeleton.

7. The electrode material according to claim 4, wherein the metal capable of reversibly absorbing/releasing a lithium metal is supported in microscopic pores formed at the surface of the porous carbon material.

8. A lithium-ion battery using the electrode material according to claim 1.

9. A lithium-ion capacitor using the electrode material according to claim 1.

* * * * *